(12) United States Patent
Kato et al.

(10) Patent No.: US 8,136,371 B2
(45) Date of Patent: Mar. 20, 2012

(54) PROCESS FOR PRODUCING GLASS SUBSTRATE AND GLASS SUBSTRATE

(75) Inventors: Yoshinari Kato, Shiga (JP); Eiji Matsuki, Shiga (JP)

(73) Assignee: Nippon Electric Glass Co., Ltd., Otsu-shi, Shiga (JP)

( * ) Notice: Subject to any disclaimer, the term of this patent is extended or adjusted under 35 U.S.C. 154(b) by 207 days.

(21) Appl. No.: 12/361,941

(22) Filed: Jan. 29, 2009

(65) Prior Publication Data
US 2009/0226733 A1 Sep. 10, 2009

Related U.S. Application Data

(63) Continuation of application No. PCT/JP2009/050699, filed on Jan. 19, 2009.

(30) Foreign Application Priority Data

Jan. 21, 2008 (JP) .................................. 2008-010062

(51) Int. Cl.
*C03B 17/06* (2006.01)
*C03B 25/10* (2006.01)
*C03B 25/12* (2006.01)

(52) U.S. Cl. ............................................. 65/95; 65/69

(58) Field of Classification Search .............. 65/41, 95; 428/141, 428
See application file for complete search history.

(56) References Cited

U.S. PATENT DOCUMENTS

| | | | |
|---|---|---|---|
| 3,508,899 A * | 4/1970 | Ward | 65/119 |
| 3,536,463 A * | 10/1970 | Michalik et al. | 65/95 |
| 5,374,595 A * | 12/1994 | Dumbaugh et al. | 501/66 |
| 5,711,778 A | 1/1998 | House | |
| 6,990,834 B2 * | 1/2006 | Pitbladdo | 65/29.21 |
| 7,207,193 B2 * | 4/2007 | Xun et al. | 65/95 |
| 2004/0055335 A1 * | 3/2004 | Lee | 65/95 |
| 2005/0160767 A1 * | 7/2005 | Novak | 65/29.17 |
| 2005/0170199 A1 * | 8/2005 | Aitken et al. | 428/630 |
| 2009/0100873 A1 * | 4/2009 | Allan et al. | 65/85 |
| 2009/0170684 A1 * | 7/2009 | Kato et al. | 501/66 |

FOREIGN PATENT DOCUMENTS

| | | |
|---|---|---|
| JP | 10-053426 | 2/1998 |
| JP | 10-053427 | 2/1998 |
| JP | 2007-186406 | 7/2007 |
| WO | WO 2007014066 A2 * | 2/2007 |

OTHER PUBLICATIONS

Corning 1737 AMLCD Glass Substrates Material Information, MIE 101, Nov. 2004.* Corning Eagle 2000 AMLCD Glass Substrates Material Information, MIE 201, Apr. 2005.*
Leendert van der Tempel, "Thermography of semi-transparent materials by a FLIR ThermaCAM SC3000 infrared camera", Koninklijke Philips Electronics N.V. 2004.*
U.S. Appl. No. 12/097,410, filed Jun. 13, 2008, Kato et al.

* cited by examiner

*Primary Examiner* — Jason L Lazorcik
*Assistant Examiner* — Cynthia Szewczyk
(74) *Attorney, Agent, or Firm* — Drinker Biddle & Reath LLP

(57) ABSTRACT

Provided are a process for producing a glass substrate usable for low-temperature p-SiTFT substrates directly in accordance with a down draw method, and the glass substrate obtained by the process. The process for producing a glass substrate includes a forming step of forming a molten glass into a ribbon shape in accordance with a down draw method, an annealing step of annealing the glass ribbon, and a cutting step of cutting the glass ribbon to give a glass substrate, in which, in the annealing step, an average cooling rate from the annealing point to the (annealing point −50° C.) is lower than an average cooling rate from the (annealing point +100° C.) to the annealing point.

13 Claims, 4 Drawing Sheets

PROCESS FOR PRODUCING GLASS SUBSTRATE AND GLASS SUBSTRATE

TECHNICAL FIELD

The present invention relates to a process for producing a glass substrate and a glass substrate, in particular to a glass substrate suitable for so-called a low-temperature p-SiTFT-type display to be driven by a polycrystalline silicon-type thin-film transistor device.

BACKGROUND ART

As a substrate for flat panel displays such as liquid-crystal displays, an aluminosilicate-type glass substrate has been widely used. The glass substrate for use in this application is required to have a small thermal shrinkage. Specifically, since a thin-film electric circuit is formed on the glass substrate, the glass substrate undergoes film formation heat treatment, patterning and the like treatment, and in these treatments, the glass substrate is exposed to a high temperature. At that time, structural relaxation occurs, and its volume thereby shrinks. When the thermal shrinkage is large, then the circuit pattern formed on the glass substrate may deviate from the initially planned one, thereby having a fatal defect in that it could not maintain electric properties.

There has been increasing a demand for high-accuracy high-definition flat panel displays year by year, and next-generation displays that are considered as hopeful ones satisfying the requirement are liquid-crystal display devices and organic EL devices to be driven by low-temperature p-SiTFT. In these displays, the heat treatment temperature in forming the low-temperature p-SiTFT on a substrate is a high temperature of from 450 to 600° C. or so, and the circuit pattern is finer. Accordingly, the glass substrate for use in this application is especially required to have a small thermal shrinkage.

Heretofore, the glass substrate of this type is formed according to a float method or a down draw method typically represented by an overflow down draw method. The float method is a method of casting a molten glass onto a molten tin (float bath) and stretching it in the horizontal direction to form the glass into a sheet. According to the method, a glass ribbon is formed on the float bath, and then the glass ribbon is annealed (on-line annealed) in a long annealing furnace having a length of 50 m or more. Accordingly, the glass substrate formed according to the float method is characterized by having a small thermal shrinkage. However, the float method has some disadvantages in that it is difficult to reduce the thickness of the glass substrate and, in addition, the glass substrate must be polished to remove the tin adhering to the glass surface.

On the other hand, the down draw method is a generic term for a forming method of drawing a glass in the vertical downward direction to form it into a sheet. For example, in the overflow down draw method that is at present widely used, a molten glass is introduced into the top of a drainpipe-like refractory (forming body) having a nearly wedge-shaped cross section, and the glass is made to overflow out from both sides thereof to flow down along the side face, and the two streams are joined together at the lower end of the refractory and stretched downward to form the glass into a sheet. The down draw method is advantageous in that glass can be formed into thin sheets. Further, in the overflow down draw method, the glass surface is not contacted with any other than air, another advantage of the method is that a glass substrate of high surface quality can be obtained even in an unpolished state. However, in the down draw method, an annealing furnace is provided just below the forming body, and therefore it is in fact impossible to dispose a long annealing furnace like in the float method. Accordingly, the annealing furnace is necessarily short, or that is, the cooling rate in the annealing furnace is high and a glass is solidified in a rapidly-cooled state, and therefore the method is problematic in that a glass substrate having a small thermal shrinkage could not be obtained.

In that situation, for use of the down-draw formed glass substrate for application to low-temperature p-SiTFT substrates and the like, it must be reheated (off-line annealed) to promote the structure relaxation of glass to thereby reduce the thermal shrinkage thereof. The reheating treatment includes, for example, once heating the glass substrate up to a temperature falling within a glass transition range (near the strain point or annealing point) higher than the heating temperature in device production, then holding it at the temperature for a predetermined period of time, thereafter annealed to a temperature lower by about 200° C. than the strain point, and then rapidly cooled at a cooling rate at which the glass is not broken.

Patent Reference 1: JP-A-10-53427
Patent Reference 2: JP-A-10-53426
Patent Reference 3: JP-A-2007-186406

DISCLOSURE OF THE INVENTION

Problems that the Invention is to Solve

In general, the above-mentioned reheating treatment is attained by putting the glass substrate in flat on a setter and then introducing it into an annealing furnace. However, the method is a batch treatment, and is therefore disadvantageous in that its efficiency is poor. In addition, since the glass substrate is put on a setter, the substrate surface may have surface defects such as scratches or dirt, and after the heat treatment, it must be polished.

For the purpose of preventing the substrate surface from having scratches or dirt, Patent Reference 1 discloses a method where substrates are stood vertically as spaced from each other in reheating treatment. The method is advantageous in that the substrate surface is not contaminated. However, for large-size substrates having a size of 500×500 mm or more, the method is disadvantageous in that the substrates may be deformed, distorted or warped by heat treatment. In addition, like the above, the method is a batch treatment and therefore its efficiency is poor.

The invention has been made in consideration of the above-mentioned situation, and an object thereof is to provide a process for producing a glass substrate usable for low-temperature p-SiTFT substrates, directly in accordance with a down draw method, and to provide a glass substrate to be obtained according to the process.

Means for Solving the Problems

The present inventors have found that, when the temperature control is optimized in an annealing step after down draw forming, then the time and the distance necessary for annealing may be shortened, therefore enabling on-line annealing, and have proposed it as the invention.

Specifically, a process for producing a glass substrate of the invention includes a forming step of forming a molten glass into a ribbon shape in accordance with a down draw method, an annealing step of annealing the glass ribbon, and a cutting step of cutting the glass ribbon to give a glass substrate, wherein in the annealing step, an average cooling rate from the annealing point to the (annealing point −50° C.) is lower than an average cooling rate from the (annealing point +100° C.) to the annealing point. In the invention, the "annealing point" is a temperature at which a glass has a viscosity of $10^{13}$ dPa·s, and this can be measured based on the method according to ASTMC336-71. The "average cooling rate" means a rate obtained in such a manner that the time in which the center portion of a glass ribbon in the sheet width direction passes through a predetermined temperature range is computed, and the temperature difference (in this case, 100° C.) within the range is divided by the time taken for the passing.

In the process of the invention, the average cooling rate from the (annealing point +100° C.) to the annealing point is preferably 30° C./min or higher.

According to this constitution, the processing time in a high temperature range having little influence on the thermal shrinkage can be shortened with ease. Accordingly, it becomes easy to shorten the time necessary for the annealing, and this is advantageous in point of planning the plant. Alternatively, the processing time in a temperature range having some influence on the thermal shrinkage may be secured sufficiently, and it becomes easy to obtain a glass having a small thermal shrinkage. In addition, it also becomes easy to produce a glass substrate that is small in warpage.

Another process for producing a glass substrate of the invention includes a forming step of forming a molten glass into a ribbon shape in accordance with a down draw method, an annealing step of annealing the glass ribbon, and a cutting step of cutting the glass ribbon to give a glass substrate, wherein the annealing step includes a first annealing stage of cooling the glass to the annealing point, a second annealing stage of cooling the glass down to Tx (wherein Tx is a temperature falling between the (annealing point −50° C.) and the (annealing point −200° C.)), and a third annealing stage of cooling the glass down to (Tx −250° C.), and an average cooling rate in the second annealing stage is lower than an average cooling rate in the first annealing stage. Herein, the temperature Tx means a temperature which falls between a temperature lower by 50° C. than the annealing point (annealing point −50° C.) and a temperature lower by 200° C. than the annealing point (annealing point −200° C.), and before and after which the average cooling rate significantly varies.

In the invention, the average cooling rate in the first annealing stage, which is defined as the average cooling rate from the (annealing point +100° C.) to the annealing point, is preferably 30° C./min or higher.

According to this constitution, the processing time in a high temperature range having little influence on the thermal shrinkage can be shortened with ease. Accordingly, it becomes easy to shorten the time necessary for the annealing, and this is advantageous in point of planning the plant. Alternatively, the processing time in a temperature range having some influence on the thermal shrinkage may be secured sufficiently, and it becomes easy to obtain a glass having a small thermal shrinkage.

In the invention, the average cooling rate in the third annealing stage is preferably higher than the average cooling rate in the second annealing stage.

According to this constitution, the processing time in a low temperature range having little influence on the thermal shrinkage can be shortened with ease. Accordingly, it becomes easy to further shorten the time necessary for the annealing, and this is advantageous in point of planning the plant.

In the process of the invention, the average cooling rate in the third annealing stage, which is defined as the average cooling rate from Tx to (Tx −250° C.), is preferably 50° C./min or higher.

According to this constitution, it becomes easy to shorten the time necessary for the annealing, and this is advantageous in point of planning the plant.

In the process of the invention, preferably, the molten glass is formed such that the glass ribbon has an effective width of 500 mm or more. The "effective width of the glass ribbon" as referred to herein means the maximum width of the glass ribbon of which the quality is guaranteed just before cutting it to give a glass substrate.

According to this constitution, the effect of the process of the invention becomes more remarkable. Specifically, when the effective width of the glass ribbon is larger, then the size of the glass substrate shall be larger. Ordinary off-line annealing requires polishing, in which, therefore, when the substrate is larger, then the polishing cost increases or the polishing itself may be difficult. Even in the method of Patent Reference 1 which does not require polishing, distortion or warpage tends to occur when the size of the glass substrate is large. Accordingly, the larger the effective width of the glass ribbon is, the larger the advantage of applying the process of the invention is.

In the process of the invention, the down draw method is preferably an overflow down draw method.

According to this constitution, a high-quality surface which does not require polishing can be obtained.

In the process of the invention, a glass having a liquidus viscosity of $10^{4.5}$ dPa·s or more is preferably used. The "liquidus viscosity" may be determined as follows. First, a glass is ground, its powder passing through a standard sieve with 30 mesh (500 μm) but remaining on a standard sieve with 50 mesh (300 μm) is put into a platinum boat, kept in a temperature gradient furnace for 24 hours, and the temperature at which a crystal is precipitated out (liquidus temperature) is measured. Further, the temperatures of a glass melt corresponding to $10^4$, $10^3$ and $10^{2.5}$ dPa·s of the glass are measured according to a platinum ball pulling-up method, and on the basis of them, a viscosity curve is drawn. From the thus-obtained viscosity curve, the viscosity corresponding to the liquidus temperature, or that is the liquidus viscosity is derived.

According to this constitution, the glass may be suitable for the overflow down draw method, and therefore it becomes easy to form a glass having excellent surface quality. Accordingly, a polishing step may be unnecessary.

In the process of the invention, a glass having a strain point of not lower than 600° C. is preferably used. Herein, the "strain point" means a temperature at which a glass has a viscosity of $10^{14.5}$ dPa·s.

According to this constitution, a glass substrate having a small thermal shrinkage can be produced easily.

In the process of the invention, preferably used is a glass containing, in terms of percentage by mass, from 50 to 70% of $SiO_2$, from 10 to 25% of $Al_2O_3$, from 3 to 15% of $B_2O_3$, from 0 to 10% of MgO, from 0 to 15% of CaO, from 0 to 15% of SrO, from 0 to 15% of BaO and from 0 to 5% of $Na_2O$.

According to this constitution, it becomes easy to select a glass composition having a high strain point and having a liquidus viscosity suitable for an overflow down draw forming. In addition, it becomes possible to achieve a glass composition which is excellent in other characteristics necessary for display substrates, such as chemical resistance, specific modulus, chemical durability, and meltability.

The process of the invention is preferably a production process for a glass substrate to be used in a flat panel display.

According to this constitution, in the heat treatment in a production step for a flat panel display, it is possible to produce a glass substrate which hardly shrinks and on which circuit pattern deviation hardly occurs.

In the process of the invention, the flat panel display is preferably a display in which a low-temperature p-SiTFT is formed on the substrate.

According to the constitution, it is possible to produce a glass substrate which hardly shrinks even when exposed to high-temperature condition in forming a low-temperature p-SiTFT thereon.

The glass substrate of the invention is produced according to the above-mentioned process.

A glass substrate of the invention has a thermal shrinkage of 30 ppm or less when heated from room temperature at a rate of 10° C./min, kept at a holding temperature of 450° C. for 10 hours, and then cooled at a rate of 10° C./min, and has an average surface roughness Ra of 0.3 nm or less and a retardation of 1.0 nm or less. The "average surface roughness Ra" used herein means a value measured according to "Method for Determination of Surface Roughness of FPD Glass Substrate" in SEMI D7-94. The "retardation" used herein means a value measured according to an optical heterodyne method using a birefringence evaluation system.

Another glass substrate of the invention has a fictive temperature of glass of from the annealing point to the (annealing point +44° C.), and has an average surface roughness Ra of 0.3 nm or less and a retardation of 1.0 nm or less. The "fictive temperature" in the invention is determined as follows. First, the same glass piece as that in thermal shrinkage determination is put into an electric furnace controlled at 700° C., then taken out of the electric furnace after 1 hour, rapidly cooled on an aluminum plate, and its thermal shrinkage is measured. The same treatment is carried out at 720° C., 740° C. and 760° C., and a graph of a relationship between treatment temperature and thermal shrinkage is drawn. On the linear approximation curve of this graph, the heat treatment temperature at which the thermal shrinkage is 0 ppm is read, and this is taken as the fictive temperature of glass.

The substrate of the invention preferably has a warpage value of 100 μm or less. The "warpage value" as referred to herein is a value obtained by measuring a sample having a size of 550 mm×650 mm, as cut out of the center part of the glass substrate, with a glass substrate warpage measurement system. In case where the glass substrate is smaller than a size of 550 mm×650 mm, the warpage of the glass substrate is measured directly as it is.

According to this constitution, the glass substrate may be used for application to low-temperature p-SiTFT substrates without any specific treatment for warpage prevention.

Preferably, the surface of the substrate of the invention is unpolished. In the invention, the "surface" means the transparent surface (main surface) of the glass substrate, and is differentiated from the edge surface polished for the purpose of preventing it from cracking, etc.

According to this constitution, the polishing step may be omitted, and the glass substrate can be produced inexpensively.

Preferably, the substrate of the invention is formed of a glass having a liquidus viscosity of $10^{4.5}$ dPa·s or more.

This constitution enables an overflow down draw forming without a polishing step.

Preferably, the substrate of the invention is formed of a glass having a strain point of not lower than 600° C.

According to this constitution, a glass substrate having a small thermal shrinkage can be obtained with ease.

Preferably, the substrate of the invention is formed of a glass containing, in terms of percentage by mass, from 50 to 70% of $SiO_2$, from 10 to 25% of $Al_2O_3$, from 3 to 15% of $B_2O_3$, from 0 to 10% of MgO, from 0 to 15% of CaO, from 0 to 15% of SrO, from 0 to 15% of BaO and from 0 to 5% of $Na_2O$.

According to this constitution, a glass having a high strain point and having a liquidus viscosity suitable for an overflow down draw forming can be obtained. In addition, it becomes easy to plan a glass substrate excellent in other characteristics necessary for display substrates, such as chemical resistance, specific modulus and meltability.

Preferably, the substrate of the invention has a short side of 500 mm or more.

According to this constitution, the effect of the invention is more remarkable. Specifically, as a heat treatment method which does not require polishing, known is the method in the above-mentioned Patent Reference 1 where substrates are stood vertically in heat treatment thereof. However, when the substrates are more large-sized, then the glass may be readily distorted or warped in the method in Patent Reference 1. On the other hand, in the invention, even when the substrate size is large, it produces no disadvantages accompanied by the distortion or warpage.

According to this constitution, the effect of the process of the invention is more remarkable. Specifically, ordinary off-line annealing requires polishing, in which, therefore, when the substrate is larger, then the polishing cost increases or the polishing itself may be difficult. Even in the method of Patent Reference 1 which does not require polishing, distortion or warpage tends to occur when the size of the glass substrate is large. Accordingly, the larger the size of the glass substrate is, the larger the advantage of the glass substrate of the invention is.

Preferably, the glass substrate of the invention is for use in a flat panel display.

According to this constitution, since the substrate hardly shrinks and circuit pattern deviation hardly occurs in the heat treatment in a production step for a flat panel display, the substrate can be used in a display with a low-temperature p-SiTFT mounted thereon.

For the substrate of the invention, the flat panel display is preferably a display in which a low-temperature p-SiTFT is formed on the substrate.

According to the constitution, the substrate hardly shrinks even when exposed to high-temperature condition in forming a low-temperature p-SiTFT thereon. Accordingly, the circuit pattern to be formed on the substrate is prevented from being deviated from the originally planned one and therefore the drawback thereof to lose the electric properties can be effectively evaded.

ADVANTAGE OF THE INVENTION

In the process for producing a glass substrate of the invention, the cooling rate in the annealing step is varied in accordance with the viscosity of glass. Accordingly, the cooling rate in the temperature region (temperature range from the annealing point to the (annealing point −50° C.)) effective for reduction in thermal shrinkage can be set sufficiently low, and the rate in the other temperature range can be set high. As a result, the time necessary for annealing can be shortened, and even in the process of producing a glass substrate according to a down draw method, a glass substrate having a small thermal shrinkage and usable in application to low-temperature p-SiTFT substrates can be produced directly.

The glass substrate of the invention has a small thermal shrinkage and has a small retardation. In addition, it is excellent in surface quality. Accordingly, without off-line annealing or polishing, the substrate is usable in application to low-temperature SiTFT substrates.

DESCRIPTION OF REFERENCE NUMERALS AND SIGNS

Figure 1:
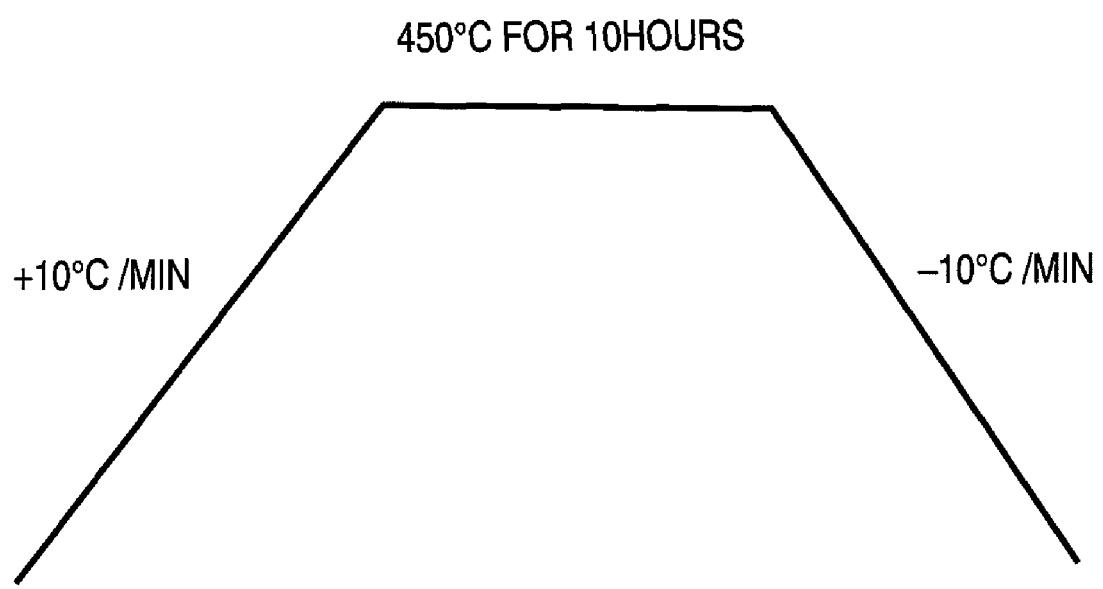
FIG. 1 is a thermal profile in determining the thermal shrinkage of a glass substrate.

1 Forming Furnace
11 Forming body
12 Cooling Roller
2 Annealing Furnace
21 Heater
22 Pulling Roller
231 First Annealing Zone
232 Second Annealing Zone
233 Third Annealing Zone
3 Cooling Chamber
4 Cutting Chamber
G1 Molten Glass
G2 Glass Ribbon
G3 Glass Sheet
G31, G32 Piece of Glass Sheet
M Marking
T Tape
F Supporting Frame
F1 Step

BEST MODE FOR CARRYING OUT THE INVENTION

The thermal shrinkage of a glass substrate depends on the cooling rate in forming a glass sheet. The cooling rate is decided by the sheet drawing rate and the temperature distribution in the annealing furnace. The present inventors' investigations have clarified that the sheet glass cooled at a high cooling rate has a large thermal shrinkage but on the contrary, the sheet glass cooled at a low rate has a small thermal shrinkage, and in particular, the cooling condition within a temperature range from the annealing point to the (annealing point −50° C.) has a significant influence on the thermal shrinkage, while on the other hand, it has little influence on the distortion or warpage. Accordingly, in the process of the invention, the cooling rate within a temperature range of from the annealing point to the (annealing point −50° C.) is kept as low as possible and the cooling rates in other temperature ranges are kept high, for the purpose of obtaining a glass substrate having a small thermal shrinkage in a down draw method where the length of the annealing furnace is limited. As controlled in that manner, the process may produce a glass substrate having a small thermal shrinkage without requiring a long annealing furnace. So far as acceptable in point of the plant, it is desirable that the low average cooling rate is kept sequentially as such even after the glass has passed through the temperature of (annealing point −50° C.). The temperature range where the low average cooling rate is kept is up to the lowermost limit of (annealing point −200° C.) or so.

The production process of the invention is described in more detail.

Firstly, a glass material prepared to have a desired composition is melted. In preparing the glass material, glass ingredients such as oxides, nitrates and carbonate, and cullet and the like may be weighed and mixed to give a glass composition having properties suitable to the use. Including silica glass, borosilicate glass, aluminosilicate glass and others, the type of the glass is not specifically defined; however, it is desirable to prepare the glass material so as to be formable according to an overflow down draw method. In forming according to an overflow down draw method, it is important that the liquidus viscosity of the glass is high.

Concretely, the liquidus viscosity of the glass is preferably at least $10^{4.5}$ dPa·s, more preferably at least $10^{5.0}$ dPa·s, even more preferably at least $10^{5.5}$ dPa·s, still more preferably at least $10^{6.0}$ dPa·s. The liquidus viscosity is the viscosity at the time of crystal precipitation; and a composition having a higher liquidus viscosity is more hardly devitrified in glass formation and is easier to be formed into a glass.

From the viewpoint of obtaining a glass substrate having a small thermal shrinkage, the strain point of glass is preferably as high as possible. A glass having a higher strain point may attain a desired thermal shrinkage even if the cooling rate is high, and therefore the productivity may be high; and in addition, the glass production in a short annealing furnace is possible. Concretely, the strain point of the glass is preferably not lower than 600° C., more preferably not lower than 630° C., even more preferably not lower than 650° C.

As the glass having a high liquidus viscosity and having a high strain point, there is mentioned an aluminosilicate-based glass containing, in terms of % by mass, from 50 to 70% of $SiO_2$, from 10 to 25% of $Al_2O_3$, from 3 to 15% of $B_2O_3$, from 0 to 10% of MgO, from 0 to 15% of CaO, from 0 to 15% of SrO, from 0 to 15% of BaO and from 0 to 5% of $Na_2O$. When the glass has the above-mentioned composition range, the glass may be excellent in the other properties necessary for display substrates, such as chemical resistance, specific modulus, chemical durability and meltability.

The glass material thus prepared is fed into a glass-melting apparatus and melted therein. The melting temperature may be suitably controlled in accordance with the type of the glass, and for example, the glass having the above-mentioned composition may be melted at a temperature of from 1500 to 1650° C. or so. Melting as referred to herein includes various steps of fining, stirring, etc.

Next, the molten glass is formed into a ribbon shape in accordance with a down draw method. As the down draw method, known are a slot (slit) down draw method, an overflow down draw method, etc. In the slot down draw method, a molten glass is drawn down from a refractory with a long drainpipe formed therein to give a sheet-like glass ribbon, and this is stretched and formed. In the overflow down draw method, a molten glass is continuously introduced into the top of a drainpipe-like forming body having a nearly wedge-shaped cross section, and the glass is made to overflow out from the top of the forming body to flow down along the side face, and the streams are joined together at the lower end of the forming body to form a sheet-like glass ribbon, and the glass ribbon is stretched and formed. In either method, the glass ribbon is gradually solidified while flowing down to give a glass sheet having a predetermined width and thickness. In the invention, any of down draw methods is employable; however, from the viewpoint of obtaining a glass substrate having a good surface quality, the overflow down draw method is preferred in which a polishing step can be omitted.

The sheet width of the glass ribbon is not specifically defined. However, regarding substrate having a larger sheet width, it may be difficult to obtain substrates which distort or warp little and which have a small thermal shrinkage without conducting polishing, in accordance with any other process than the process of the invention. Therefore, it may be said that the advantage of employing the process of the invention may be larger for substrates having a larger sheet width. Concretely, the effective width of the glass ribbon is preferably 500 mm or more, more preferably 600 mm or more, still more preferably 700 mm or more, furthermore preferably 800 mm or more, still furthermore preferably 900 mm or more, especially preferably 1000 mm or more. The effective width may be varied by controlling the length of the long drainpipe or the like through which a glass is drawn out in the slot down draw method, or by controlling the length of the forming body or the like in the overflow down draw method.

Not specifically defined, the thickness of the glass ribbon may be selected in accordance with the use. For example, in use for mobile displays, the thickness of the glass substrate to be obtained finally is preferably from 0.1 to 0.5 mm or so, and is preferably from 0.3 to 1.1 mm or so in use for monitors and TVs. The thickness of the glass ribbon may be varied by controlling the pull rate of the molten glass, the sheet drawing rate of the glass ribbon, etc.

Next, the formed glass ribbon is annealed. The cooling rate in annealing is suitably controlled in accordance with the viscosity of the glass. Concretely, it is controlled, separately in the temperature range not lower than the annealing point (first annealing stage), in the temperature range from the annealing point to Tx (second annealing stage), and in the temperature range from Tx to (Tx −250° C.) (third annealing stage). The average cooling rate in the first annealing stage is defined as the average cooling rate from the (annealing point +100° C.) to the annealing point. The average cooling rate in the second annealing stage is defined as the average cooling rate from the annealing point to Tx. The average cooling rate in the third annealing stage is defined as the average cooling rate from Tx to (Tx −250° C.).

In the invention, the average cooling rate from the annealing point to the (annealing point −50° C.) is lower than the average cooling rate in the first annealing stage. Preferably, the rate difference between the two is 5° C./min or more, more preferably 10° C./min or more, still more preferably 15° C./min or more, furthermore preferably 20° C./min or more, especially preferably 25° C./min or more. When the cooling rate difference between the two temperature ranges is larger, then the time necessary for the entire annealing or the annealing distance may be more readily shortened. In addition, the cooling rate in the second annealing stage may be sufficiently lowered, and the thermal shrinkage of the substrate may be reduced with ease.

In addition, the average cooling rate in the third annealing stage is preferably higher than the average cooling rate in the second annealing stage. More preferably, the rate difference between the two is 20° C./min or more, more preferably 30° C./min or more, still more preferably 35° C./min or more, furthermore preferably 50° C./min or more, still furthermore preferably 55° C./min or more, still furthermore preferably 60° C./min or more, still furthermore preferably 70°/min or more, especially preferably 75° C./min or more. When the cooling rate difference between the two temperature ranges is larger, then the time necessary for the entire annealing or the annealing distance may be more readily shortened. In addition, the cooling rate in the second annealing stage may be sufficiently lowered, and the thermal shrinkage of the substrate may be reduced with ease.

Concrete cooling rates are described below.

The temperature range corresponding to the first annealing stage, especially the temperature range from the (annealing point+100° C.) to the annealing point is a region having some influence on the sheet thickness, the strain, the warpage, etc. The average cooling rate is preferably 30° C./min or higher, more preferably 35° C./min or higher, especially preferably 40° C./min or higher. When the cooling rate in this range is low, then the glass shape cannot be rapidly defined, and therefore the shape control is difficult, and as a result, the properties including distortion and warpage of the substrate may worsen. In addition, since the distance corresponding to the temperature range in the annealing furnace becomes long, the temperature range corresponding to the second annealing stage, especially the distance corresponding to the temperature range of from the annealing point to the (annealing point −50° C.) cannot be sufficiently secured, and therefore, it may become difficult to sufficiently lower the cooling rate in this temperature range and a glass substrate having a small thermal shrinkage may not be obtained. The uppermost limit of the average cooling rate is preferably 300° C./min, more preferably 150° C./min. When the cooling rate in this temperature range is too high, then it may be difficult to homogeneously cool the glass in the width direction, and the sheet thickness control may be difficult and the substrate may easily be much distorted or warped.

The temperature range corresponding to the second annealing stage, especially the temperature range from the annealing point to the (annealing point −50° C.) is a region having a significant influence on the reduction in the thermal shrinkage of the substrate. The average cooling rate from the annealing point to the (annealing point −50° C.) is preferably lower than 30° C./min, more preferably 20° C./min or lower, especially preferably 15° C./min or lower. When the cooling rate in this range is high, then the thermal shrinkage of the glass cannot be reduced. As so mentioned in the above, the cooling rate in this range is preferably as low as possible; but in fact, the reduction in the cooling rate is limited. In other words, for lowering the cooling rate, it may be effective to lower as much as possible the sheet drawing rate in addition to the temperature control in the annealing furnace; however, the rate at which the sheet can be drawn mechanically stably is limited. In consideration of the limit of the sheet drawing rate, the lowermost limit of the cooling rate may be about $(1000/L)$ ° C./min in which L (cm) indicates the length of the annealing furnace; and it may be impossible to stably draw the sheet at a rate lower than this limit, or that is, at such a low rate, there may occur some problems in that the sheet thickness fluctuates, or the sheet may be distorted or warped. In consideration of the practicable length of the annealing furnace, the average cooling rate in this temperature range is recommendably 0.34° C./min or higher, more recommendably 1° C./min or higher, still more recommendably 2° C./min or higher, especially recommendably 5° C./min or higher.

In the above-mentioned temperature range, when the cooling rate fluctuation in the sheet width direction is further reduced, then it is favorable since the thermal shrinkage fluctuation in the sheet width direction may be reduced.

The temperature range corresponding to the second annealing stage preferably includes a lower temperature range; concretely, as described in the above, it preferably includes even the temperature Tx present between the (annealing point −50° C.) to the (annealing point −200° C.).

The temperature range corresponding to the third annealing stage is from Tx to (Tx −250° C.). In case where Tx= (annealing point −50° C.), the temperature range corresponding to the third annealing stage is from the (annealing point −50° C.) to the (annealing point −300° C.). The average cooling rate in this temperature range is preferably 50° C./min or higher, more preferably 70° C./min or higher, especially preferably 90° C./min or higher. In case where the cooling rate in this range is low, then the time necessary for the entire annealing or the cooling distance may be difficult to shorten, and on-line annealing according to a down draw method may be difficult. However, for preventing the glass ribbon from being broken by rapid cooling, the uppermost limit of the average cooling rate is preferably 1000° C./min, especially preferably 500° C./min.

Not specifically defined, the cooling rate from (Tx −250° C.) to room temperature may be within a range having no risk of breakage by rapid cooling, and for example, it may be cooling in ambient air.

Thereafter, the glass ribbon is cut at a predetermined length to give a glass sheet. It may be further processed for re-cutting, edge treatment, washing, etc., whereby a glass substrate having a small thermal shrinkage may be obtained.

A preferred production apparatus for producing the glass substrate of the invention according to the above-mentioned production process of the invention is described below. Various conditions in the following description are the same as those in the above-mentioned production process, and therefore details thereof are omitted herein.

The production apparatus for the glass substrate according to the production process of the invention includes a forming furnace of forming a molten glass into a ribbon shape in accordance with a down draw method, an annealing furnace of annealing the glass ribbon, and a cutting unit for cutting the glass ribbon into glass substrates, in which the annealing furnace has a first annealing zone for annealing the glass ribbon in the temperature range corresponding to the first annealing stage (for example, the region from the (annealing point +100° C.) to the annealing point), and a second annealing zone for annealing it in the temperature range corresponding to the second annealing stage (for example, the region from the annealing point to the (annealing point −50° C.)), and the temperature control is conducted such that the average cooling rate in the second annealing zone is lower than the average cooling rate in the first annealing zone. According to this constitution, the temperature control may be conducted such that the cooling rate in the temperature range (second cooling zone) effective for reducing the thermal shrinkage is sufficiently low, and the rate in the other temperature region is high. Accordingly, the annealing furnace may be compact, and in the production apparatus for a glass substrate in which a down draw method is employed, a glass substrate having a small thermal shrinkage can be directly produced. The cooling rate in each zone can be controlled by controlling the power of the heater in the glass-conveying direction. More concretely, plural controllable heaters are provided in the glass-conveying direction and the power of each heater is separately controlled.

In this apparatus, the temperature control is preferably conducted such that the average cooling rate in the second annealing zone becomes lower than 30° C./min. According to this constitution, a glass substrate having a small thermal shrinkage can be obtained with ease.

In this apparatus, the temperature control is preferably conducted such that the cooling rate fluctuation in the sheet width direction is reduced. According to this constitution, the thermal shrinkage fluctuation in the sheet width direction can be reduced. The cooling rate in the sheet width direction can be controlled by controlling the power of the heater in the sheet width direction. More concretely, plural controllable heaters are provided in the sheet width direction and the power of each heater is separately controlled.

In this apparatus, the temperature control is preferably conducted such that the average cooling rate in the first annealing zone becomes 30° C./min or higher. According to this constitution, the length of the first annealing zone that has little influence on the thermal shrinkage may be reduced with ease. Accordingly, the annealing furnace may be compact, and a glass substrate which has a small thermal shrinkage and is little in warpage can be produced efficiently.

Preferably, this apparatus has a third annealing zone for annealing the glass in the temperature range corresponding to the third annealing stage (for example, in the region from the (annealing point −50° C.) to the (annealing point −300° C.)), and the temperature control is conducted such that the average cooling rate in the third annealing zone is higher than the average cooling rate in the second annealing zone. According to this constitution, the length of the third annealing zone having little influence on the thermal shrinkage may be reduced. Accordingly, the annealing furnace may be more compact.

In this apparatus, the temperature control is preferably conducted such that the average cooling rate in the third annealing zone is 50° C./min or higher. According to this constitution, the length of the annealing furnace may be reduced to be more compact with ease.

In this apparatus, the length of the annealing furnace is preferably 200 cm or more, more preferably 500 cm or more, still more preferably 800 cm or more, especially preferably 1000 cm or more, and also preferably 3000 cm or less. From the viewpoint of reducing the thermal shrinkage, or from the viewpoint of increasing the sheet drawing rate to increase the productivity without changing the cooling rate, the annealing furnace is preferably longer. However, when the annealing furnace is too long, then the glass melting unit or the forming furnace must be thereby set at higher sites, and this may bring about limitation on the latitude in planning the plant. In addition, the glass ribbon to be drawn from the forming unit may be too heavy, and the forming apparatus and the glass itself may hardly hold the glass ribbon. According to this constitution, however, both the above-mentioned requirements contradictory to each other may be satisfied with ease.

The glass substrate of the invention obtained in the manner as above is described below.

The glass substrate of the invention has an extremely small thermal shrinkage, while it can be formed in accordance with a down draw method, especially in accordance with an overflow down draw method.

Concretely, the thermal shrinkage of the glass, when heated from room temperature at a rate of 10° C./min, then kept at a holding temperature of 450° C. for 10 hours, and then cooled at a rate of 10° C./min (in thermal treatment according to the temperature schedule as in FIG. 1), is 30 ppm or less, preferably 28 ppm or less, more preferably 25 ppm or less. When the thermal shrinkage is more than 30 ppm and when the substrate is used as a low-temperature p-SiTFT substrate, then the circuit pattern formed thereon may be deviated from the initial planning and can not keep electric properties.

The surface roughness Ra is 0.3 nm or less. When the surface roughness is more than 0.3 nm, it may be considered that the substrate would be polished, and the disadvantage thereof is that the production cost is high.

The retardation is 1.0 nm or less. When the retardation is more than 1.0 nm, then there arise problems that the pattern may be deviated in cutting the glass substrate, or a homogenous image cannot be obtained owing to birefringence in use for liquid-crystal display substrates.

For the glass substrate of the invention, the fictive temperature of glass is preferably lower.

The fictive temperature is a temperature of a supercooled liquid having the same structure as a glass structure, and this is an index of the structure of glass. Glass is poorly viscous and is liquid at a high temperature, and in this stage, the glass has open structure. When the glass is cooled, the glass structure becomes dense and is solidified. This glass structure change occurs since the glass is likely to be in the most stable state at that temperature. However, when the cooling rate of glass is too high, then the glass may be solidified before it has a dense structure corresponding to the temperature, and therefore the glass structure may be solidified in the high-temperature condition. The temperature corresponding to the solidified glass structure is referred to as a fictive temperature.

Accordingly, when the fictive temperature is lower, then the glass structure is denser, and therefore, the thermal shrinkage of the glass may be readily smaller. Accordingly, the fictive temperature is preferably (annealing point+50° C.) or less, more preferably (annealing point+44° C.) or less, still more preferably (annealing point +40° C.) or less, especially preferably (annealing point+35° C.) or less.

On the other hand, in order to lower the fictive temperature, the cooling rate in the first annealing zone and the second annealing zone should be lowered. However, in case where a glass is produced by on-line annealing according to a down draw method, when the cooling rate is too low, then the sheet cannot be stably drawn thereby causing sheet thickness fluctuation, distortion and warpage. In addition, this produces limitation on facilities. Taking the above into consideration, the fictive temperature of glass is preferably not lower than the annealing point, more preferably not lower than the (annealing point+5° C.), still more preferably not lower than the (annealing point+10° C.), even more preferably not lower than the (annealing point+16° C.).

In addition, it is preferable than the surface of the glass substrate of the invention is unpolished. Polishing the surface is disadvantageous in that the production cost increases.

It is preferable that the glass substrate of the invention is a large-size glass substrate having a short side of 500 mm or more, more preferably 600 mm or more, still more preferably 700 mm or more, furthermore preferably 800 mm or more, still furthermore preferably 900 mm or more, especially preferably 1000 mm or more. When the substrate size is larger, then it may be difficult to produce glass substrates which distort or warp little and which have a small thermal shrinkage without polishing, in accordance with any other process than the above-mentioned process of the invention. Accordingly, the substrate of the invention having a large size is extremely advantageous for practical use.

Not specifically defined, the thickness of the glass substrate may be selected in accordance with the use. For example, in use for mobile displays, the thickness is preferably from 0.1 to 0.5 mm or so, and is preferably from 0.3 to 1.1 mm or so in use for monitors and TVs.

When the glass has a higher strain point, the glass substrate tends to have a smaller thermal shrinkage. Accordingly, it may be said that the strain point of glass is preferably higher. Concretely, the strain point of the glass is preferably not lower than 600° C., more preferably not lower than 630° C., especially preferably not lower than 650° C.

The glass for constituting the glass substrate of the invention may be any one suitable to the use thereof, including various types of glass such as silica glass, borosilicate glass, and aluminosilicate glass. Above all, preferred are those formable according to an overflow down draw method. Specifically, the glass substrate formed according to an overflow down draw method has excellent surface quality and is advantageous in that it can be used without polishing.

The glass formable according to an overflow down draw method is a glass having a liquidus viscosity of $10^{4.5}$ dPa·s or more, preferably $10^{5.0}$ dPa·s or more, more preferably $10^{5.5}$ dPa·s or more, still more preferably $10^{6.0}$ dPa·s or more.

As the glass having a high liquidus viscosity and having a high strain point, as well as excellent in the other properties necessary for display substrates, such as chemical resistance, specific modulus, chemical durability and meltability, there may be mentioned an aluminosilicate-based glass containing, in terms of % by mass, from 50 to 70% of $SiO_2$, from 10 to 25% of $Al_2O_3$, from 3 to 15% of $B_2O_3$, from 0 to 10% of MgO, from 0 to 15% of CaO, from 0 to 15% of SrO, from 0 to 15% of BaO and from 0 to 5% of $Na_2O$. The reason for the composition definition is described below.

$SiO_2$ is an ingredient to be a glass network former. When the content of $SiO_2$ is too large, then it is unfavorable since the high-temperature viscosity may be high and the meltability may be poor, and in addition, the devitrification resistance may also be poor. When it is too small, then it is unfavorable since the chemical durability worsens.

$Al_2O_3$ is an ingredient to raise the strain point. When the content of $Al_2O_3$ is too large, it is unfavorable since the devitrification resistance may be poor and the chemical durability to buffered hydrofluoric acid may be poor. On the other hand, when it is too small, it is unfavorable since the strain point may lower. Preferably, the content thereof is from 10 to 20%.

$B_2O_3$ is an ingredient acting as a flux to enhance the meltability of glass. When the content of $B_2O_3$ is too large, it is unfavorable since the strain point may lower and the chemical resistance to hydrochloric acid may worsen. On the other hand, when it is too small, the viscosity at high temperature may increase and the meltability may worsen. Preferably, the content thereof is from 5 to 15%.

MgO is an ingredient to lower the viscosity at high temperature to enhance the meltability of glass, and its content is preferably from 0 to 10%, especially preferably from 0 to 5%. When the MgO content is too large, the devitrification resistance may be poor and the chemical resistance to buffered hydrofluoric acid may worsen.

CaO is also an ingredient to lower the high-temperature viscosity to enhance the meltability of glass, like MgO; and its content is preferably from 0 to 15%, especially preferably from 0 to 12%. When the CaO content is too large, it is unfavorable since the devitrification resistance may be poor and the chemical resistance to buffered hydrofluoric acid may worsen.

SrO is an ingredient to enhance the devitrification resistance and the chemical durability, and its content is preferably from 0 to 15%, especially preferably from 0 to 10%.

BaO is an ingredient to enhance the devitrification resistance and the chemical durability, and its content is preferably from 0 to 15%, especially preferably from 0 to 5%. When the BaO content is too large, it is unfavorable since the density may be large, and the high-temperature viscosity may increase and the meltability may worsen.

$Na_2O$ is an ingredient to lower the high-temperature viscosity of glass to enhance the meltability thereof, and its content is preferably from 0 to 5%. When the $Na_2O$ content is too large, there may occur a disadvantage in that the strain point may lower. From the viewpoint of preventing the degradation of the property of TFT, it is desirable that the content of the alkali metal ingredient including $Na_2O$ is limited to at most 0.1%.

In addition to the above, other various ingredients such as a fining agent may be added, if desired.

EXAMPLES

Examples and Comparative Examples of the invention are described in detail hereinunder, with reference to the drawings attached hereto.

Figure 2:
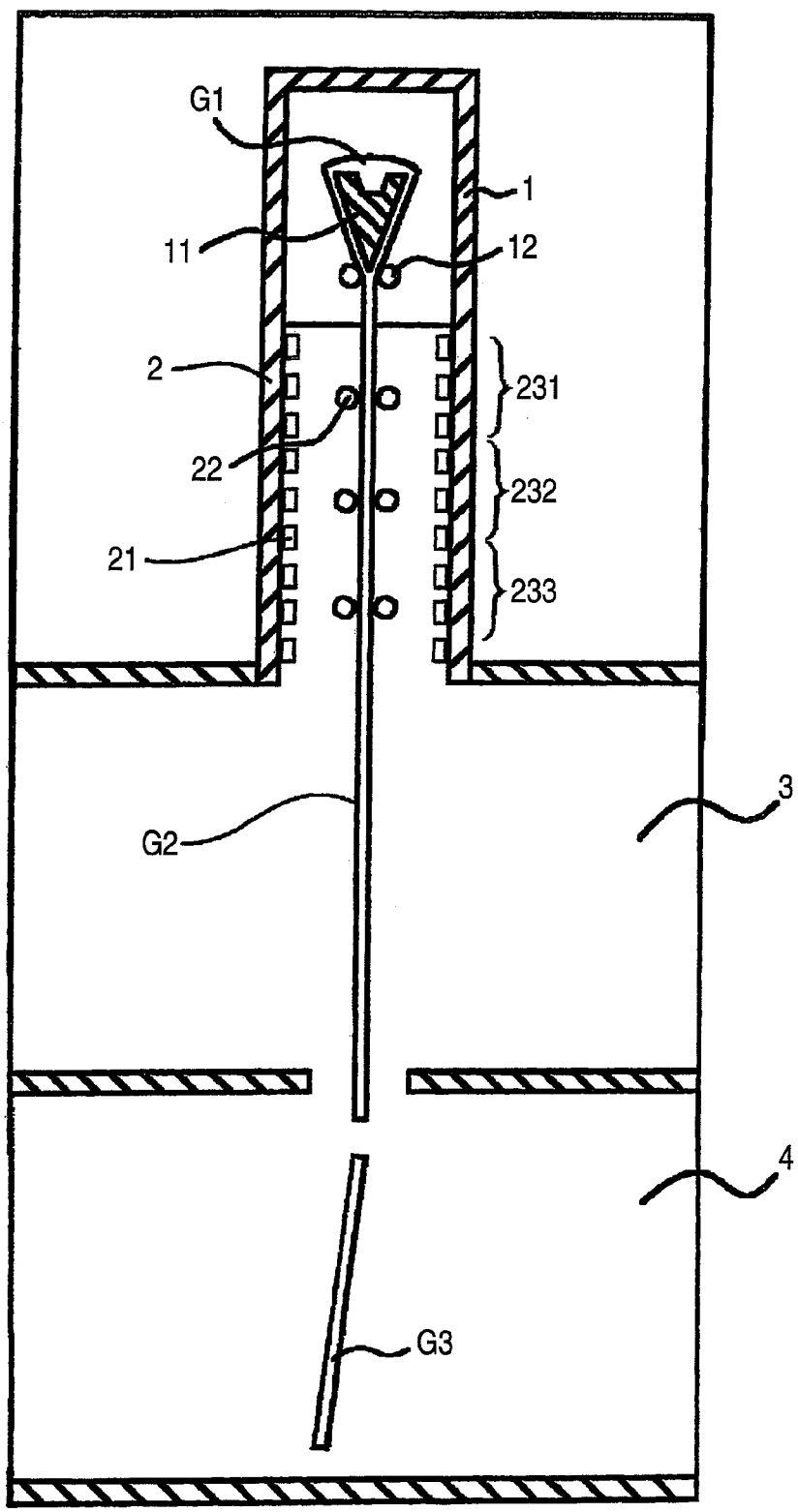
FIG. 2 is an outline front view showing a production apparatus for a glass substrate in carrying out the invention.

FIG. 2 is an outline front view showing a production apparatus for a glass substrate in carrying out the invention. The production apparatus is for producing a glass substrate according to an overflow down draw method, and includes a forming furnace 1 in which a molten glass G1 fed to the funnel-like forming body 11 having a nearly wedge-shaped cross section is made to overflow out from the top thereof and is fused at the bottom thereof to form a glass ribbon G3, an annealing furnace 2 in which the glass ribbon G2 is annealed to reduce the thermal shrinkage thereof, a cooling chamber 3 in which the annealed glass ribbon G2 is fully cooled, and a cutting chamber 4 in which the cooled glass ribbon G2 is cut into a predetermined size, each disposed in that order from the top thereof. In this Example, the overall length of the annealing furnace 2 is represented by L cm, and L means a value within a range of from 200 to 3000 (cm). Inside the annealing furnace, plural panel heaters 21 are provided on both sides of the glass ribbon G2 so as to face the glass ribbon G2. The heaters 21 are disposed in plural series and in plural rows in the machine direction (vertical direction) and in the sheet width direction (horizontal direction), and their temperature can be independently controlled. In the cutting chamber 4, a transportation route through which the glass substrate G3 is transported into the subsequent step not shown in the drawing (for example, an edge polishing step, etc.) is separately disposed.

Next, the production process for a glass substrate of the invention using the above-mentioned production apparatus is described.

In this production apparatus, first, a molten glass A is fed to the top of the forming body 11 disposed inside the forming furnace 1, and the molten glass G1 is then made to overflow out from the top of the forming body 11, then fused at the bottom thereof to form a sheet-like glass ribbon G2. Near the forming body 11, disposed are a pair of cooling rollers 12, and the glass ribbon G2 is sandwiched between the cooling rollers 12 at its both edges and therefore its shrinkage in the width direction is minimized.

Next, the formed glass ribbon G2 is annealed in the annealing furnace 2 to reduce the thermal shrinkage thereof. In the annealing furnace 2, disposed are plural pairs of pulling rollers 22 in the vertical direction, and the glass ribbon G2 is drawn downward, while pulled in the width direction by the pulling rollers 22 so as not to shrink in the width direction by the surface tension or the like. The inside of the annealing furnace 2 is sectioned into a first annealing zone 231 corresponding to the temperature range from the (annealing point of the glass +100° C.) to the annealing point, a second annealing zone 232 corresponding to the range of from the annealing point to Tx, and a third annealing zone corresponding to the temperature range of from Tx to (Tx −250° C.); and the output of each heater 21 is controlled such that the cooling rate in every zone differs from each other. The glass ribbon G2 is drawn down while its cooling rate is controlled in the annealing furnace, whereby the thermal shrinkage thereof can be efficiently reduced. Tx in each Example is shown in Table.

Below the annealing furnace 2, disposed is a cooling chamber 3. The glass ribbon G2 is cooled without any control to nearly room temperature in the cooling chamber 3.

Just below the cooling chamber 3, disposed is a cutting chamber 4. The glass ribbon cooled to around room temperature in the cooling chamber 3 is cut into a glass sheet G3 having a predetermined size in the cutting chamber 4, and then transported into the subsequent step.

Using the above-mentioned production apparatus, a glass substrate having a composition of 60% of $SiO_2$, 15% of $Al_2O_3$, 10% of $B_2O_3$, 5% of CaO, 5% of SrO and 2% of BaO in terms of % by mass and having a size of 550 mm×650 mm×0.7 mm (annealing point 705° C., strain point 650° C.) was produced under various annealing conditions. The annealing condition, and the thermal shrinkage, the fictive temperature, the retardation, the warpage value and the average surface roughness Ra of the glass substrate obtained are shown in Tables 1 and 2. L in the Tables indicates the overall length of the annealing furnace.

TABLE 1

|  | 1 | 2 | 3 |
|---|---|---|---|
| Sheet Drawing Rate (cm/min) | 0.114 L | 0.15 L | 0.436 L |
| Average Cooling Rate (° C./min) | | | |
| First Annealing Zone | 40 | 50 | 45 |
| Second Annealing Zone | 15 | 50 | 300 |
| Third Annealing Zone | 100 | 100 | 200 |
| Annealing Point (° C.) | 705 | 705 | 705 |
| Tx (° C.) | 655 | 605 | 605 |
| Thermal Shrinkage (ppm) | 25 | 45 | 55 |
| Fictive temperature (° C.) | 735 | 750 | 755 |
| Average Surface Roughness Ra (nm) | 0.2 | 0.2 | 0.2 |
| Retardation (nm) | 0.5 | 0.6 | 0.7 |
| Warpage value (μm) | 50 | 30 | 50 |

TABLE 2

|  | 4 | 5 |
|---|---|---|
| Sheet Drawing Rate (cm/min) | 0.048 L | 0.060 L |
| Average Cooling Rate (° C./min) | | |
| First Annealing Zone | 60 | 60 |
| Second Annealing Zone | 10 | 15 |
| Third Annealing Zone | 100 | 200 |
| Annealing Point (° C.) | 705 | 705 |
| Tx (° C.) | 605 | 605 |
| Thermal Shrinkage (ppm) | 15 | 20 |
| Fictive temperature (° C.) | 730 | 730 |
| Average Surface Roughness Ra (nm) | 0.2 | 0.2 |
| Retardation (nm) | 0.5 | 0.5 |
| Warpage value (μm) | 50 | 30 |

As is obvious from the Tables, the thermal shrinkages of the samples Nos. 1, 4 and 5 produced at an average cooling rate in the second annealing zone kept lower than that in the first annealing zone were not larger than 25 ppm and were on a level practicable as low-temperature p-SiTFT substrates.

Herein, the sheet drawing rate means the peripheral velocity of the pulling roller.

The average cooling rate means a rate computed as follows. The time in which the center part in the width direction of a glass ribbon passes through each annealing zone is measured, and the temperature difference in the annealing zones (in the first annealing zone, 100° C.; in the second annealing zone, 50° C. for the sample No. 1, and 100° C. for the samples Nos. 2 to 4; in the third annealing zone, 250° C.) is divided by the ribbon-passing time in each zone.

Figure 3A:
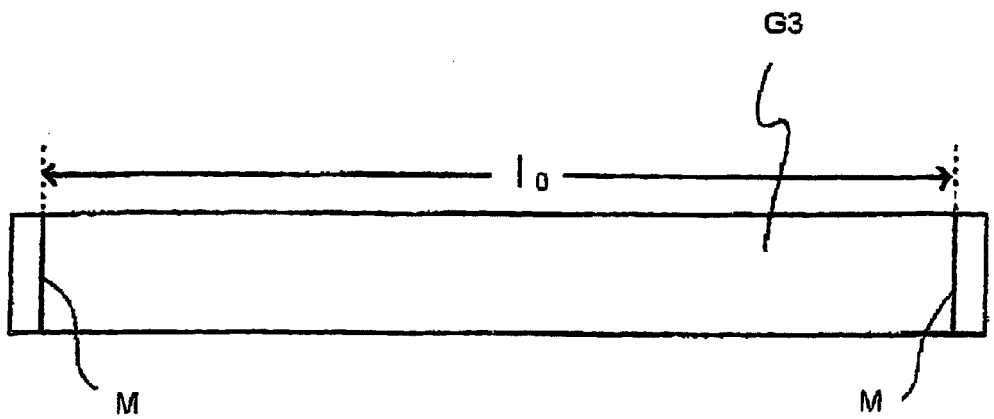
FIGS. 3A to 3C are explanatory views showing a method for thermal shrinkage determination.
Figure 3B:
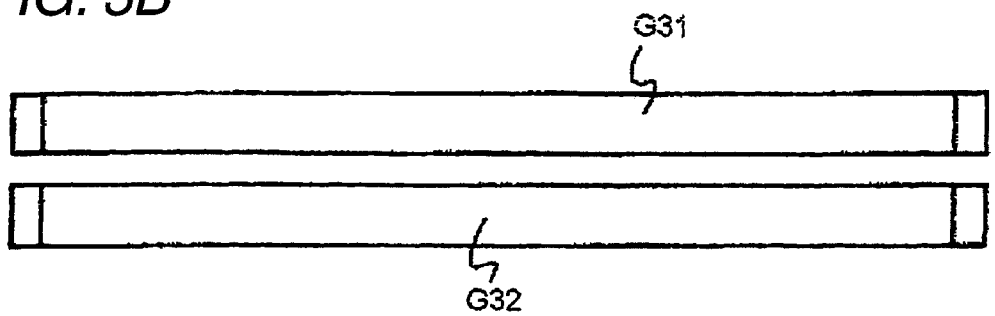
Figure 3C:
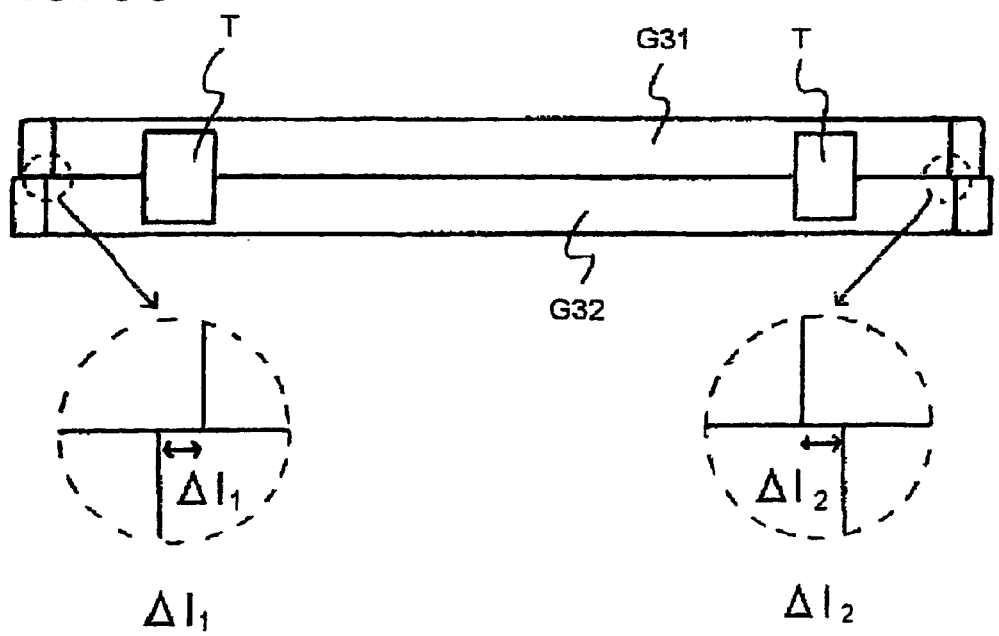

The thermal shrinkage was determined as follows. As in FIG. 3A, linear markings were given to predetermined sites of the glass sheet G3; then as in FIG. 3B, the glass sheet G3 was broken vertically to the markings M, and was divided into two glass sheet pieces G31 and G32. Only one glass sheet piece G31 was subjected to a predetermined heat treatment (heated from room temperature at a rate of 10° C./min, kept at a holding temperature of 450° C. for 10 hours, and then cooled at a rate of 10° C./min). Next, as in FIG. 3C, the heat-treated glass sheet piece G31 and the untreated glass sheet G32 were put in parallel, and the two were fixed with an adhesive tape T, and the marking deviation was determined. The thermal shrinkage was computed according to the following numerical formula 1.

$$S = \frac{\Delta l_1(\mu m) + \Delta l_2(\mu m)}{l_0(mm)} \times 10^3 (ppm) \qquad \text{Numerical Formula 1}$$

The fictive temperature was determined as follows. First, the same glass sheet pieces as in the above-mentioned thermal shrinkage determination were put into an electric furnace controlled at 700° C., and after 1 hour, these were taken out of the electric furnace and rapidly cooled on an aluminum plate, and thereafter the thermal shrinkage of the sample was determined. The same treatment was carried out at 720° C., 740° C. and 760° C., and a graph of a relationship between treatment temperature and thermal shrinkage was drawn. On the linear approximation curve of this graph, the heat treatment temperature at which the thermal shrinkage was 0 ppm was read, and this was taken as the fictive temperature of the glass.

The surface roughness Ra was measured according to "Method for Determination of Surface Roughness of FPD Glass Substrate" in SEMI D7-94.

The retardation was measured according to an optical heterodyne method using a Uniopto's birefringence evaluation system.

The warpage value was measured as follows. A sample piece having a size of 550 mm×650 mm, as cut out from the center part of the glass substrate, was measured with a Toshiba's glass substrate warpage measurement system.

Comparative Experiment

For comparison, the sample No. 3 was off-line annealed and the changes in the thermal shrinkage, the retardation, the warpage value and the surface roughness Ra thereof were confirmed.

Figure 4:
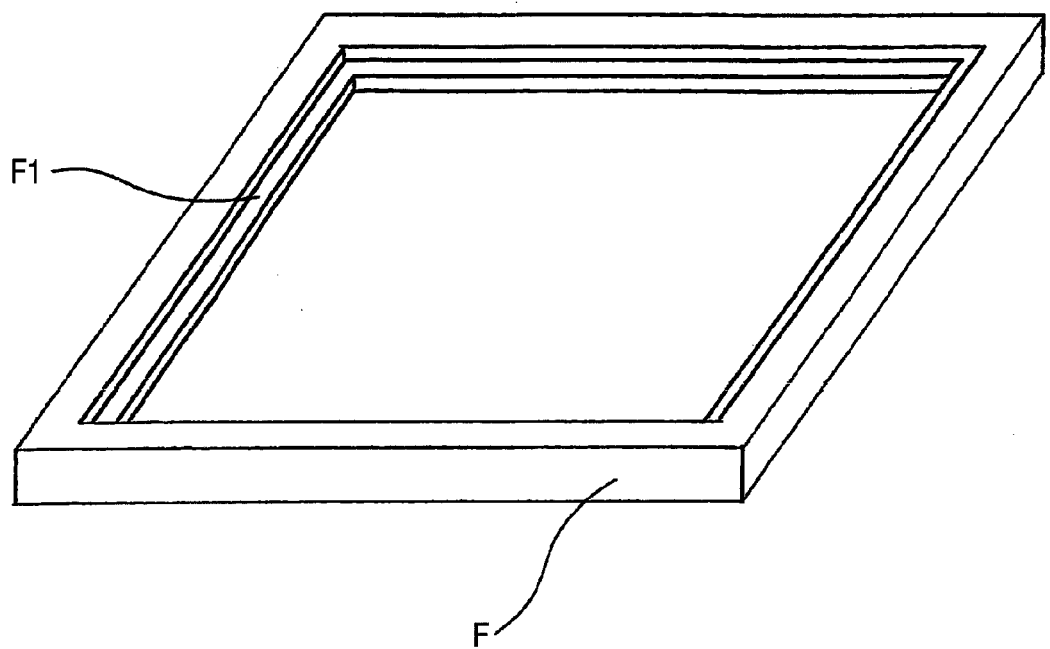
FIG. 4 is an explanatory view showing a supporting frame for use in off-line annealing.

Firstly, each glass sheet was cut into a size of 400 mm×500 mm. In the heat-treatment furnace, the sample No. 3-1 was vertically supported and the sample No. 3-2 were obliquely supported for annealing treatment therein. In supporting the glass sheet, used was a low-expansion crystallized glass-made supporting frame F having an outer dimension of 480 mm×630 mm×5 mm and an inner dimension of 390 mm×490 mm, and having a step F1 of 405 mm×505 mm×0.5 mm formed in the surface, as in FIG. 4. For the vertical supporting, the glass sheet was sandwiched between the above-mentioned two supporting frames and stood vertically. For the oblique supporting, the glass sheet was fitted into the step of the supporting frame, then the supporting frame was inclined by 70°. In that condition, the two were annealed.

Figure 5:
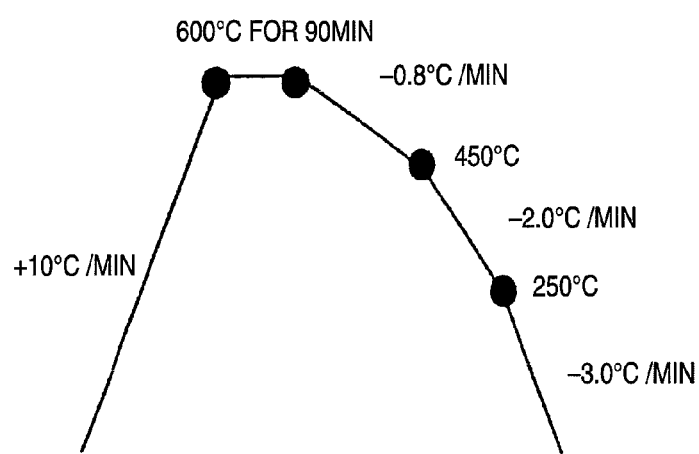
FIG. 5 is a thermal profile in off-line annealing.

The temperature profile in the off-line annealing is as shown in FIG. 5. The glass sheet was heated from room temperature up to 600° C. at a rate of 10° C./min, then kept at 600° C. for 90 minutes, and cooled from 600° C. to 450° C. at a rate of 0.8° C./min, from 450° C. to 250° C. at a rate of 2° C./min, and from 250° C. to room temperature at a rate of 3° C./min. For the off-line annealing, used was a heat-treatment furnace of a hot air circulation stirring system heated with a Kanthal wire heater. The dimension inside the furnace was such that the width was 2000 mm, the height was 2000 mm and the depth was 5000 mm.

The results are shown in Table 3.

TABLE 3

|  | 3 | 3-1 | 3-2 |
|---|---|---|---|
| Off-line Annealing Treatment | untreated | vertical supporting | oblique supporting |
| Thermal Shrinkage (ppm) | 55 | 10 | 10 |
| Fictive temperature (° C.) | 755 | 720 | 720 |
| Average Surface Roughness Ra (nm) | 0.2 | 0.2 | 0.2 |
| Retardation (nm) | 0.7 | 1.1 | 1.7 |
| Warpage value (μm) | 50 | 50 | 120 |

As is obvious from the Table, it was confirmed that the off-line annealed samples Nos. 3-1 and 3-2 had larger retardation and warpage value than those of the sample No. 3 before the annealing.

The invention should not be limited to the above-mentioned embodiments, and not overstepping the spirit and the scope thereof, the invention may be changed and modified in other various embodiments.

For example, in the Examples, the invention is applied to the production of glass sheet according to the overflow down draw method; not limited to it but similarly thereto, however, the invention is also applicable to production of glass sheet, for example, according to a slot down draw method.

While the invention has been described in detail and with reference to specific embodiments thereof, it will be apparent to one skilled in the art that various changes and modifications can be made therein without departing from the spirit and scope thereof.

The present application is based on a Japanese patent application No. 2008-010062 filed on Jan. 21, 2008, the contents of which are incorporated herein by reference.

INDUSTRIAL APPLICABILITY

The glass substrate of the invention is suitable as a substrate for liquid-crystal displays and organic EL displays having low-temperature p-SiTFT mounted thereon. Other than these, it may be used also for substrates for various flat panel displays such as a-SiTFT (amorphous silicon-type thin film transistor) liquid-crystal displays, plasma displays and field-emission displays; and for substrates on which various electronic display function devices or thin films are formed.

The invention claimed is:

1. A process for producing a glass substrate, comprising:
   a forming step of forming a molten glass into a ribbon shape in accordance with a down draw method,
   an annealing step of annealing said glass ribbon, and
   a cutting step of cutting said glass ribbon to give a glass substrate,
   wherein the annealing step comprises a first annealing stage of cooling the glass ribbon from (annealing point +100° C.) to the annealing point and a second annealing stage of cooling the glass ribbon from the annealing point to (annealing point −50° C.),
   wherein an average cooling rate in the second annealing stage is 10° C./min or more lower than an average cooling rate in the first annealing stage.

2. The process for producing a glass substrate according to claim 1, wherein the average cooling rate of the first annealing stage is 30° C./min or higher.

3. A process for producing a glass substrate, comprising:
a forming step of forming a molten glass into a ribbon shape in accordance with a down draw method,
an annealing step of annealing said glass ribbon, and
a cutting step of cutting said glass ribbon to give a glass substrate, wherein the annealing step includes;
a first annealing stage of cooling the glass to the annealing point, wherein the first annealing stage is defined as from (annealing point +100° C.) to the annealing point,
a second annealing stage of cooling the glass down from the annealing point to Tx, wherein Tx is a temperature falling between the (annealing point −50° C.) and the (annealing point −200° C.), and
a third annealing stage of cooling the glass down to (Tx −250° C.), and
an average cooling rate in the second annealing stage is 10° C./min or more lower than an average cooling rate in the first annealing stage.

4. The process for producing a glass substrate according to claim 3, wherein the average cooling rate in the first annealing stage is 30° C./min or higher.

5. The process for producing a glass substrate according to claim 3, wherein an average cooling rate in the third annealing stage is higher than the average cooling rate in the second annealing stage.

6. The process for producing a glass substrate according to claim 3, wherein the average cooling rate in the third annealing stage, which is defined as an average cooling rate from Tx to (Tx −250° C.), is 50° C./min or higher.

7. The process for producing a glass substrate according to claim 1 or 3, wherein the molten glass is formed such that said glass ribbon has an effective width of 500 mm or more.

8. The process for producing a glass substrate according to claim 1 or 3, wherein the down draw method is an overflow down draw method.

9. The process for producing a glass substrate according to claim 1 or 3, wherein a glass having a liquidus viscosity of $10^{4.5}$ dPa·s or more is used.

10. The process for producing a glass substrate according to claim 1 or 3, wherein a glass having a strain point of not lower than 600° C. is used.

11. The process for producing a glass substrate according to claim 1 or 3, wherein a glass containing, in terms of percentage by mass, from 50 to 70% of $SiO_2$, from 10 to 25% of $Al_2O_3$, from 3 to 15% of $B_2O_3$, from 0 to 10% of MgO, from 0 to 15% of CaO, from 0 to 15% of SrO, from 0 to 15% of BaO and from 0 to 5% of $Na_2O$ is used.

12. The process for producing a glass substrate according to claim 1 or 3, which is a production process for a glass substrate to be used in a flat panel display.

13. The process for producing a glass substrate according to claim 12, wherein the flat panel display is a display in which a low-temperature p-SiTFT is formed on the substrate.

* * * * *